UNITED STATES PATENT OFFICE.

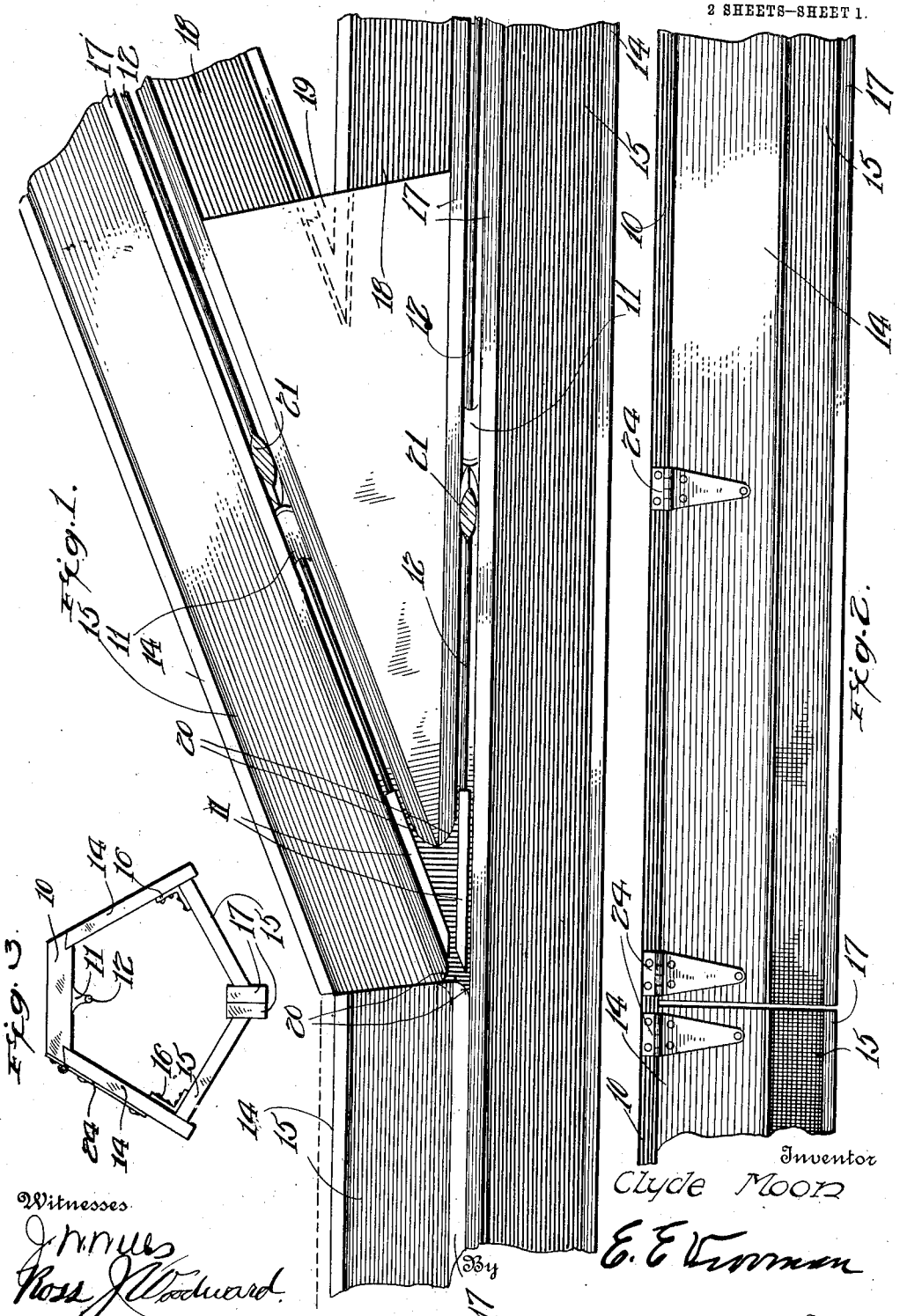

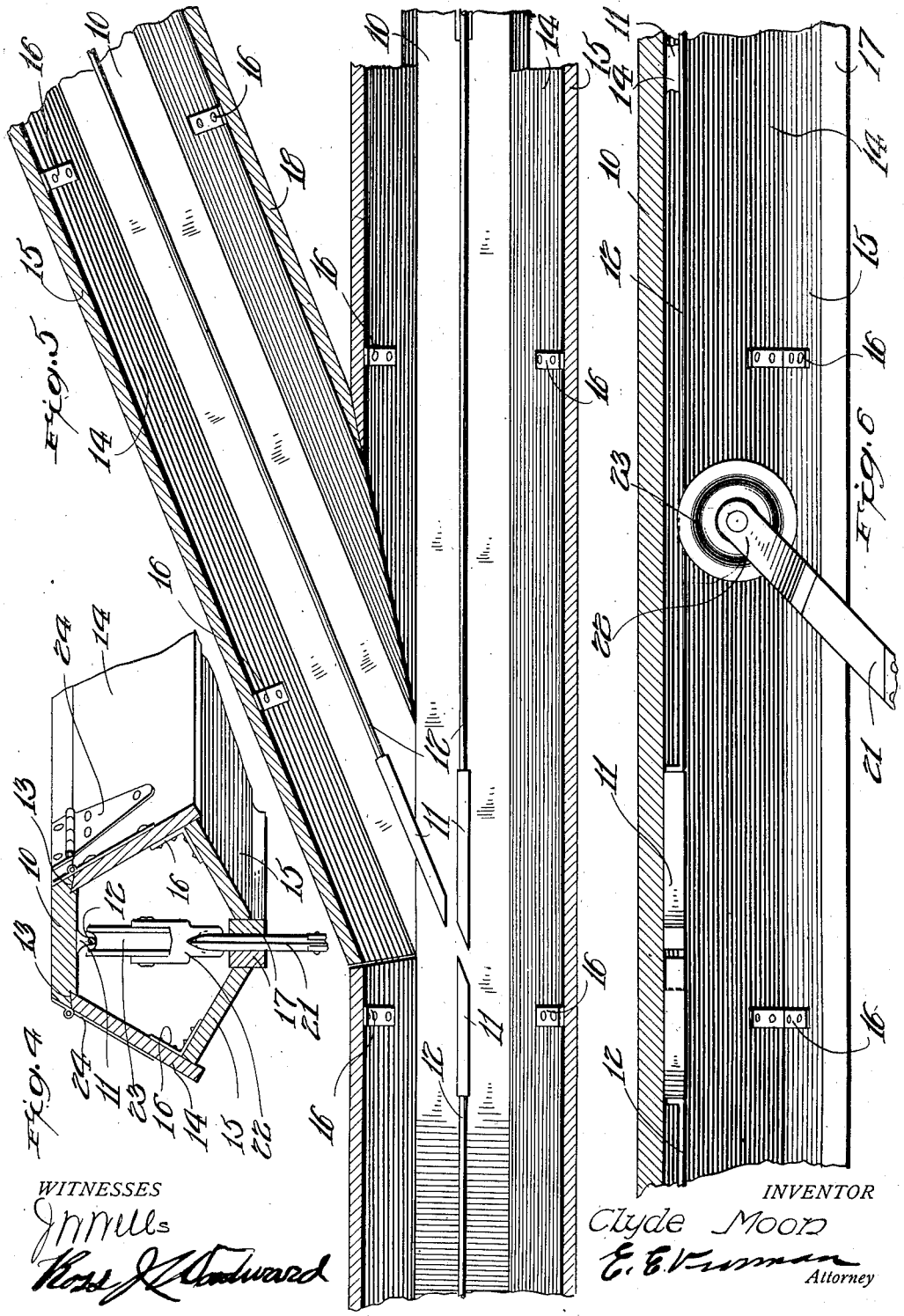

CLYDE MOON, OF McDONALD, WEST VIRGINIA, ASSIGNOR OF THREE-EIGHTHS TO OTHA ALEXANDER, OF MOUNT HOPE, WEST VIRGINIA, AND ONE-FOURTH TO BELDEN WALACE, OF THAYER, WEST VIRGINIA.

COVERING FOR WIRE.

1,034,276.     Specification of Letters Patent.     Patented July 30, 1912.

Application filed January 13, 1912. Serial No. 671,051.

*To all whom it may concern:*

Be it known that I, CLYDE MOON, a citizen of the United States, residing at McDonald, in the county of Fayette and State of West Virginia, have invented certain new and useful Improvements in Covering for Wire, of which the following is a specification, reference being had therein to the accompanying drawing.

This invention relates to cover for trolley wires which are used in mines so that the trolley wire will be protected from dust which would ordinarily collect upon the wire and prevent the proper operation of the car which receives its power from the wire. This protector comprises a plurality of sections which are normally closed but which are opened successively as the car advances along the track.

This invention is illustrated in the accompanying drawings, in which:

Figure 1 is a bottom plan view of the wire covering. Fig. 2 is a side elevation of the covering. Fig. 3 is an end elevation. Fig. 4 is a transverse sectional view. Fig. 5 is a longitudinal transverse sectional view. Fig. 6 is a vertical sectional view.

Referring to the accompanying drawings by numerals it will be seen that this covering comprises an upper cover plate 10 which carries the blocks 11 with which the trolley wire 12 is connected. The plate 10 is provided with longitudinally extending cut-out portions forming the seats 13 in which the upper ends of the side doors fit. The side doors comprise the upper and lower sections 14 and 15, the sections being connected together by any suitable means and braced by means of the angle irons 16. Ribs 17 are carried by the lower sections 15 and normally fit close together so that the housing will be tightly closed. It should be noted that the sections 14 and 15 are positioned at such an angle that their weight will hold them in the closed position shown in Fig. 3 when the trolley pole is not passing between the ribs 17.

When it is necessary to provide a switch so that the mining car may be carried onto a siding, the inner doors 18 are rigidly secured to the plate 10 and are rigidly connected together by means of the plate 19. The ends of the ribs 17 are curved as shown at 20 so that the side doors of the sections may be readily opened by the trolley pole so as to permit the trolley pole to enter the section. The trolley pole 21 is elliptical in cross section and carries the harp 22 in which the trolley wheel 23 is mounted. As the car advances along the track, the trolley pole comes in contact with the ends of the ribs so that the trolley pole acts as a cam to support the side doors. After the trolley pole has passed through one section of the wire covering, the doors swing together again upon their hinges 24 so that the section will be tightly closed. It will thus be seen that there has been provided an inclosure for the trolley wire which normally remains shut to protect the wires from dust but which is so constructed that the sections of the closure will be opened by the trolley pole when the trolley pole enters a section. This covering will also protect the miners from coming in contact with the wire and prevent the wire from dropping down if it works loose from its support.

What is claimed is:—

1. A wire covering comprising a horizontal plate having longitudinally extended seats cut adjacent to its edges, side plates hinged to said horizontal plate and fitting into said seats when in their normal position, plates carried by said side plates, and bars secured to the free edges of said last mentioned plates normally contacting to form a normally closed protector of the character described.

2. A wire covering comprising a horizontal plate having longitudinally extending seats formed adjacent its edges, depending side doors pivotally connected with said horizontal plate and fitting into said seats when in their normal position, and bars secured to the free edges of said doors and normally contacting to form a normally closed protector of the character described.

In testimony whereof I hereunto affix my signature in presence of two witnesses.

CLYDE MOON.

Witnesses:
  J. E. GARRETT,
  LUTHER BOLEN.